(12) United States Patent
Choi

(10) Patent No.: US 12,108,912 B2
(45) Date of Patent: Oct. 8, 2024

(54) ELECTRIC THERMAL CONTAINER

(71) Applicant: Goldmund S.A., Caba (AR)

(72) Inventor: Do Sun Choi, Caba (AR)

(73) Assignee: GOLDMUND S.A., Caba (AR)

( * ) Notice: Subject to any disclaimer, the term of this patent is extended or adjusted under 35 U.S.C. 154(b) by 678 days.

(21) Appl. No.: 17/362,293

(22) Filed: Jun. 29, 2021

(65) Prior Publication Data

US 2022/0192422 A1 Jun. 23, 2022

(30) Foreign Application Priority Data

Dec. 20, 2020 (AR) .............................. P20200103689

(51) Int. Cl.
| | |
|---|---|
| A47J 41/00 | (2006.01) |
| A47J 27/21 | (2006.01) |
| A47J 27/212 | (2006.01) |
| A47J 45/06 | (2006.01) |
| B65D 51/00 | (2006.01) |
| B65D 81/38 | (2006.01) |

(52) U.S. Cl.
CPC ......... *A47J 41/005* (2013.01); *A47J 27/2105* (2013.01); *A47J 27/21083* (2013.01); *A47J 27/21091* (2013.01); *A47J 27/21175* (2013.01); *A47J 27/21191* (2013.01); *A47J 27/212* (2013.01); *A47J 41/0027* (2013.01); *A47J 41/0072* (2013.01); *A47J 41/0094* (2013.01); *A47J 45/06* (2013.01); *B65D 51/00* (2013.01); *B65D 81/3837* (2013.01); *A47J 2202/00* (2013.01)

(58) Field of Classification Search
CPC .. A47J 41/005; A47J 41/0027; A47J 41/0072; A47J 41/0094; A47J 27/2105; A47J 27/2183; A47J 27/21091; A47J 27/21175; A47J 27/21191; A47J 27/212; A47J 45/06; A47J 2202/00; B65D 51/00; B65D 8/3837

See application file for complete search history.

(56) References Cited

FOREIGN PATENT DOCUMENTS

| | | |
|---|---|---|
| CN | 2100840 U | 4/1992 |
| CN | 2256691 Y | 6/1997 |
| CN | 2366025 Y | 3/2000 |
| CN | 2788708 Y | 6/2006 |
| CN | 201216507 Y | 4/2009 |
| CN | 101637362 A | 2/2010 |
| CN | 201977414 U | 9/2011 |

(Continued)

*Primary Examiner* — Shawntina T Fuqua
(74) *Attorney, Agent, or Firm* — Fox Rothschild LLP

(57) ABSTRACT

A thermally insulated container comprising: a frusto-conical support base internally comprising a heat source with connection to an external electrical source, a flat support base, an elongated main body of circular section with thermally insulated walls with connectors arranged at the base of said body to electrically link a shielded electrical resistance; a plug with a shutter that acts as a closure of the main body mounted in the mouth of said body by means of a thread and comprising a safety pressure element. The thermally insulated container is particularly adequate for heating water to two temperature settings to be used to prepare mate beverage or to prepare other infusions. In a first embodiment the container holds 500cc of water and in another embodiment it holds one liter of water.

17 Claims, 10 Drawing Sheets

(56) References Cited

FOREIGN PATENT DOCUMENTS

| | | | | |
|---|---|---|---|---|
| CN | 102240166 | A | 11/2011 | |
| CN | 202206562 | U | 4/2012 | |
| CN | 202312850 | U | 7/2012 | |
| CN | 103844919 | A | 6/2014 | |
| CN | 204617992 | U | 9/2015 | |
| CN | 109077612 | A | 12/2018 | |
| CN | 209136211 | U | 7/2019 | |
| CN | 111110031 | A * | 5/2020 | ........ A47J 27/21008 |
| EP | 0170409 | A1 | 2/1986 | |
| WO | WO-2011101642 | A2 * | 8/2011 | .............. A47J 27/21 |

* cited by examiner

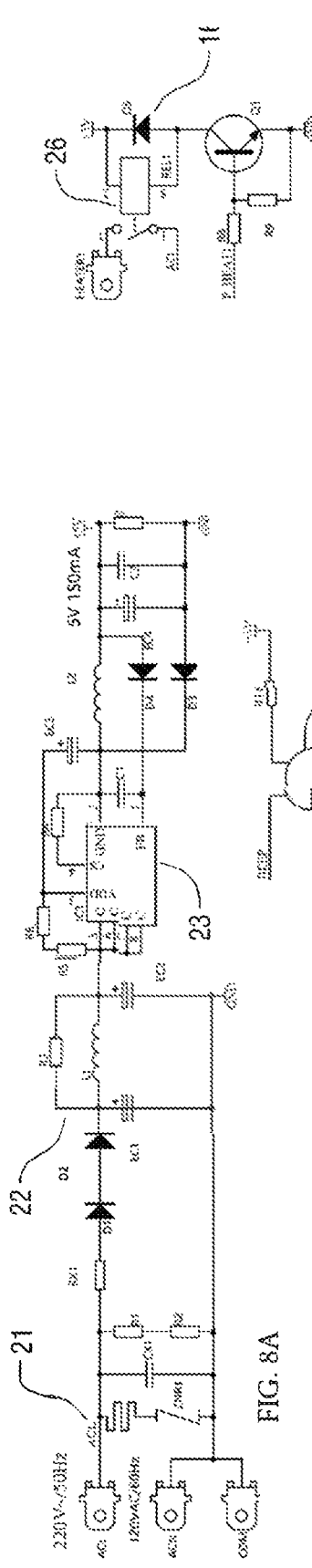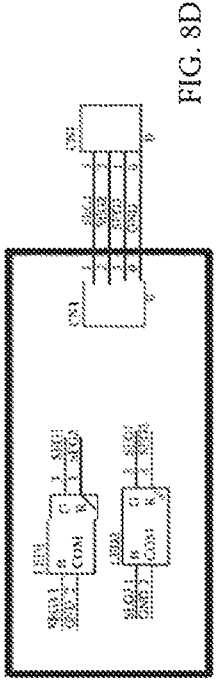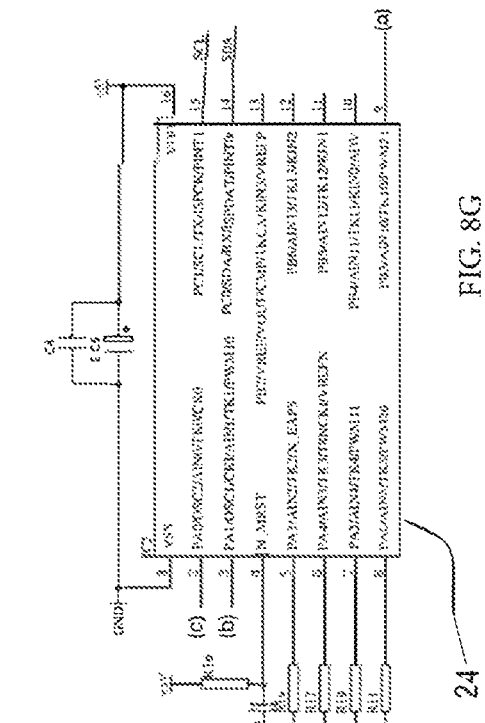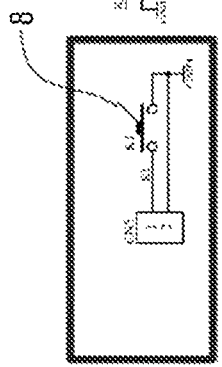
FIG. 8A
FIG. 8B
FIG. 8C
FIG. 8D
FIG. 8E
FIG. 8F
FIG. 8G

ELECTRIC THERMAL CONTAINER

CROSS REFERENCE TO RELATED APPLICATION

This application claims priority to Argentina Patent Application No. 20200103689, filed Dec. 20, 2020, the disclosure of which is hereby incorporated by reference in its entirety.

FIELD OF INVENTION

The present invention belongs to the field of containers for heating water to prepare beverages, particularly those containers that keep water hot long enough to consume it, and more particularly, it refers to thermal containers used to prepare mate beverage.

BACKGROUND TO THE STATE OF THE ART

Containers used to electrically heat water in order to prepare beverages are known. Typically, these containers are in the shape of a kettle or jug that can be electrically heated with devices that provide electrical power to an internally mounted resistor to heat the water.

Mate is a beverage made with leaves of a plant called in Spanish yerba mate (*Ilex Paraguariensis*); the plants are dried, cut and ground to form yerba mate, which has a bitter flavor due to the tannins present in its leaves. The foam generated when preparing mate beverage is due to the glycosides it contains. There are consumers who prefer to sweeten the mate beverage with sugar, honey, or natural or synthetic sweeteners. There are also people who usually add aromatic herbs such as pennyroyal, orange peel, coffee, etc., to yerba mate to modify its original flavor.

Mate beverage was already consumed in America since pre-Columbian times by some ethnic groups of Tupi-Guarani origin, as well as by other ethnic groups that traded with them. This drink was quickly adopted by the Spanish colonizers, and remained as part of the cultural heritage in Uruguay, Argentina, Paraguay, southern Brazil, southern Bolivia, and southern Chile. Even countries with cultures as the Syrians adopted it. It is normally drunk hot using a straw, called in Spanish "bombilla", placed in a small container called mate, cuia, porongo or guampa, where the yerba mate is placed to prepare the beverage.

The water is heated in different ways and in different containers using various ways to bring it to the ideal temperature of approximately 80° C. and prepare the mate beverage. The means normally used to prepare mate beverage are kettles or jugs with water on fire or electric heaters, kettles or jugs thermally insulated and electrically heated with resistances, and cylindrical bottle-type containers that are thermally isolated from the environment, where previously heated water is available to preserve its temperature.

There are several solutions provided to form sets or devices to prepare mate beverage that comprise all the necessary elements to carry out this task. All these sets have some shortcoming that makes them specific to be used in certain conditions or situations, although not all of these that can occur when drinking mate beverage.

Document AR060820A4 discloses an apparatus for preparing mate beverage that allows keeping the water temperature at 84° C. and also maintains the container at a constant temperature using for the infusion of water in yerba mate a metal holder with thermostat, substantially attached to a metal plate which is heated by means of a heating electrical resistance. The mate holder with thermostat acts as a barrier to the dissipation of heat from the infusion container to the environment which prevents it from cooling down when it is in a waiting period. An electronic control circuit allows, by means of external commands, the selection of functions of the appliance to obtain from warm water at 40° C. to boiled water, passing through intermediate temperature values from 40° C. to 84° C. continuously adjustable within that range and temperature of 90° C. for infusions of coffee or tea. Temperature sensors monitor the water to be heated and the metal plate of the mate holder, sending the information to the control circuit which regulates the energy to be sent to the heating resistances of the water and the metal plate of the mate holder, the former responding to the predetermined value on the control panel and the second at a temperature determined by the manufacturer (approximately 50° C.). The device emits an acoustic and visual warning when the water reaches 50° C. to start preparing the mate beverage with warm water and also gives a warning of the same type when the preset temperatures for the different functions are reached and also emits an optical and acoustic signal when the water in the tank drops to a certain level in the mate beverage preparing function to indicate that water must be replenished to continue in this function. Besides the mate beverage preparing function, it allows to obtain coffee or tea, or simply extract warm water at 40° C., in the range of 40° C. to 84° C., 90° C. or boiled water. However, the device of the cited document has several differences and deficiencies compared to the present invention. The device of the cited document is different from the present invention in the way of heating and maintaining the temperature, namely: (i) in the present invention the resistance is associated with the base and has no contact with water; (ii) in the present invention the temperature is regulated by an NTC sensor and an electronic controller; (iii) the present invention has a choice of two temperatures; (iv) the thermos of the present invention comprises a pressure safety element and (v) the thermos of the present invention comprises a resettable thermal protection and a non-resettable electrical fuse. Finally, in the present invention, once the water is heated the container serves as a thermos to prepare the mate beverage; and the top lid serves as a mate beverage container.

Other documents related to the art of thermos with water heater are also known.

Document AR096763A4 describes a thermos for heating water that has an internal thermometer with a display, with which it is possible to choose the desired temperature. However, the device of the cited document (i) does not have an automatic temperature control; (ii) it does not have a temperature selector and (iii) it does not have the safety elements in case of sensor failure.

Document CN103844919A describes a thermos with an electric heater, provided with an electric heater under the container of the thermos. On the outside, the thermos is equipped with a socket and power indicator. When used, by turning on the power, water can be directly heated with an electric heater. However, the cited document does have a temperature selector or control and it only boils water and keeps it very hot, which is not recommended to prepare the mate beverage. It also does not have a pouring spout for mate beverage.

Document CN201977414U discloses a thermos that includes a thermal insulation cup with handle, in which the bottom of the thermal insulation cup is equipped with an electric heater, an electric heater wiring through a slide switch to which the cable in thermos cup plate with plug. An additional heater and slide switch are provided on the thermos cups, and pressing the slide switch can connect and interrupt the electric heater circuit. However, the device of the cited document does not have temperature control and does not have a pouring spout for mate beverage.

CN2366025Y describes an electric hot water bottle with a PTC thermistor as a heating element. The thermos is made up of bottle cap parts, cap seat parts, shell, glass liner, PTC liquid heater, a component for mounting in vehicle, etc., and where the heating element uses a thermistor (PTC) to be used as a liquid pyrotoxin heater, which is placed in the lower center of the glass container. However, the drawbacks of the cited document are that the heater is in contact with the water, it is designed to operate on 12-24 V, it has no spout for serving mate beverage and the lid cannot be used as a container for mate beverage.

Document CN2100840U describes an electric heating thermos composed of glass liner, thermal insulation layer, bottle shell and electric heating element, etc. The glass cladding features a metallic outer protective material, an enamel layer coated on the inner wall, and wrapped in the thermal insulation layer outside the glass cladding. However, the cited document does not describe a water temperature control suitable for preparing mate beverage; it has a manual pump to remove the water; it is used leaning on the table and does not have the shape of a thermos to hold with a hand.

Document CN204617992U discloses a compact power thermos comprising a thermos body and a base for a portable power supply. The heating block is provided in the body of the described thermos, it is connected by a rotary knob with a base of the portable power supply, and the heating block is connected with the base of the described portable power supply by a cable. The base of the portable power supply can provide electrical power to the thermos body and can also provide electrical power for mobile electronic devices such as mobile phones. The heater block is provided with the thermos body, temperature sensor, heater and electrical leak detection circuit board, to heat the water inside the thermos to the predetermined temperature and an automatic shutdown completes the heating process when the thermos plate heating and electrical leak detection circuit detects a current malfunction. However, due to the construction made with two lithium ion batteries it is apparent that the device only keeps the water warm but is not capable of heating the water from room temperature to an adequate high temperature for preparing mate beverage.

CN102240166A discloses a double layer vacuum electric heating vacuum vessel for boiling water. The invention is provided with the cylindrical shell of the port between the inner plate and the bottom plate of the shell to solve the prior art, and conducts the heat of the thermal radiation from the inner plate outward, to improve the thermal insulation. Main points of the technical description: the vessel comprises a shell, an inner bag, a closed bottle cap, a base of the bottle foot, an electric heater, an electric pump and a control circuit. Between the shell and the inner bag, the electric heater is located in the inner cavity of the lower inner bladder, the power cord of the electric heater connecting to the inner bag. The electric pump is divided into the motor and the pump casing; the latter being divided into two parts. The motor is installed in the base of the bottle, and there is a magnetic rotating disk installed on the motor shaft. The pump casing is installed in the lower inner part of the inner bladder cavity, the lower surface of the impeller of the pump casing is provided with a magnetic rotating disk, the magnetic rotating disk of the motor attracts through the vacuum layer of the inner bag and the casing and the impeller magnetic rotating disk, and the blowing channel of the pump casing chamber is inside the inner bladder cavity and is connected from the outlet tube of the inner bag. However, the device of the cited document does not have the shape of a thermos; the water outlet is by means of a pump; the spout is not suitable for drinking mate beverage and the device lacks a temperature regulator.

Document EP0170409A1 discloses an electric heater type vacuum container including a body having a tubular outer shell (19) and a tubular inner shell (16) arranged inside the outer shell to form a thermal insulating vacuum space between them. A tubular connecting member (20) has an open lower end and an upper end wall that has an opening formed therethrough. The upper end wall of the connecting member is fixedly attached to a lower surface of a lower wall of the inner shell, and the tubular connecting member fits into an opening (14d) of a lower wall of the outer shell and it is fixedly secured adjacent to it, at the open lower end thereof to hold the lower walls of the inner and outer shells in spaced relationship to each other. An electric heater (24) is disposed within the inner shell to heat the contents of the inner shell. The electric heater has a body portion that extends downward through the opening in the lower wall of the inner housing and the opening in the wall at the upper end of the tubular connecting member. However the device of the cited document is not a thermos but a kettle in which the resistor is in contact with water; the spout is not suitable for preparing mate beverage and does not comprise a temperature regulator.

Document CN202312850U discloses an electric water heater, which comprises a container with a handle, the bottom of the container is provided with an electric heater unit, and the electric heater unit is provided with a power line socket and including battery in the electric heating unit. The invention provides a simple structure; the bottom of the container is provided with an electric heater unit, and the electric heater unit is provided with a power line plug, and a battery in the electric heater unit. The power line is connected with a power line plug. The electric heater unit heats the water in the container and, after the heating is finished, the battery is connected with the electric heater unit. However the cited document does not specifically mention the heating capacity; it has heating through the electrical network and only comprises battery maintenance; it does not have temperature control and lacks a mate beverage spout.

Document CN2788708Y describes an electric heating thermos, including the container body and the container lid. There is a heating unit power connected to the container, and steam outlets on the above-mentioned container body on the side wall or on the body of the lid of the container. The bottom of the lid of the indicated container has a one-way valve that controls the water pressure, the valve being located between the neck of the container and the steam vent. The thermos container preserves the heat, having two different kinds of different functions. Two types of electric heating systems supply the heat to let the water boil and diverts the steam from the container through a valve and steam vent, to stop heating after boiling. The automatic valve closing performs the insulation function. However, the device of the document is a thermal jug that does not have a spout suitable for mate beverage; it has no temperature control and has an internal heater that is in contact with the water.

Document CN101637362A discloses an electrical heat insulating container, comprising a housing, inner bag, container lid, electrical heating elements and base, and the lower end of the described housing is fixed on the base. The lower end of the inner bag is provided with the open annular catch groove, and the inner bag of the open annular catch groove described below is provided with the flange of the container down, and this flange and the annular catch groove described open can generate the effect of the heating element. The center of the electric heating elements and the inner bag are provided with an elastic sealing gasket, and immerse the electric heating elements to avoid water. However the device of the document is a thermal kettle; it does not have temperature control and it does not have a suitable peak for preparing mate beverage.

Document CN209136211U discloses an electric heat preservation vessel. It includes: a vacuum boiler body, including an outer casing and an inner container, the inner container is connected with the outer casing and a space is provided between the outer casing and the inner container; the inner container is connected with an intermediate plate, the intermediate plate is provided with an installation groove and the heating device in the installation groove; a base, is provided with an electrical connection structure and a chassis, the chassis includes a side wall and a bottom plate, the electrical connection structure is arranged on the bottom plate, the side wall is connected with the casing; the middle partition is between the middle plate and the base; the middle partition is connected to the side wall; the middle partition The deck is provided with an upper recess, the middle deck is provided with a lower recess, the upper recess and the lower recess are attached, and the upper recess and the lower recess are provided with holes for cables. The electrical connection structure is electrically connected to the heating device through the cable passing through the cable hole. An outer sealed space is formed between the intermediate plate and the intermediate partition, and an inner sealed space is formed between the inner bladder and the intermediate plate. In the document, an intermediate plate and an intermediate partition are arranged at the bottom of the container, so that the bottom of the container forms a two-layer vacuum space, which can effectively prevent heat dissipation and improve the performance of heat preservation. However, the device in the document is not a thermos but an electric kettle with a removable base; it does not have a mate beverage preparation spout and it does not have temperature control.

Document CN201216507Y describes a vacuum electric heating vessel. The document describes an electric heating vessel with double layer vacuum insulation construction. Main points of the technical data: it comprises a casing, contains a sap cavity casing, and an electric heater, a liquid inlet and outlet. An intermediate layer retains heat under vacuum between the shell and the shell of the sap cavity. The electric heater is located in and contained on the outside of the shell of the sap cavity; the tip of the electrode is a stretched shell. The shell is transparent, and the outer wall of the shell of the sap cavity in the intermediate layer that retains heat under vacuum is provided with a pressure gauge or thermometer. However, the device of the cited document does not have automatic temperature control but rather has a thermometer to interrupt heating and does not have a spout for mate beverage.

Document CN202206562U refers to a liquid heater, comprising a type of electric heating chassis and electric kettle. The electric heating chassis comprises a heat transfer substrate. The heat transfer substrate is provided with a heating element. The heating element comprises a first power connector end and a second source link, wherein said heat transfer substrate is provided with a heat insulating coating, and said heating element is an electrothermal alloy heating sheet that is arranged on the heat insulating coating, and wherein the chassis also comprises and is used for the fixed structure of the heating sheet by pressing and fixing on the heat insulating coating. The heating foil can only be made by punching thin foil electrothermal alloy. The electric kettle comprises the kettle body and said electric heating chassis which is located at the bottom of the kettle body. However the device of the cited document is an electric jug that does not have temperature control and it does not have an adequate spout for mate beverage.

Document CN109077612A describes an electrically heated thermos container with an atomizer. The technical solution is as follows: the thermo container comprises a container body, in which an inner container is arranged on the container body. A handle is arranged on the outer side of the container body and an auxiliary cavity below the inner container it is arranged in the container body. An atomizing sheet, a water guide pipe and a circuit component are arranged in the auxiliary cavity. The circuit component is connected with the atomizing blade. A steam outlet corresponding to the auxiliary cavity is arranged in the body of the container. The atomizer blade is directed towards the water vapor outlet. One end of the water guide pipe is connected to the inner container and the other end of the water guide pipe is directed towards the spray blade. The outer wall of the inner container is provided with an electric heating cable, a temperature sensor and a controller, in which the electric heating cable and the temperature sensor are connected with a controller. A power supply input interface is also provided in the container body, and the interface is connected with the circuit component and the controller. The thermos container can store water and functions as a humidifier. By using the thermos container, the humidity of the surrounding environment can be improved. The thermos container has the advantages of automatic water heating and multiple functions, and the atomizer is suitable for the existing water container. However, the document device does not have a temperature control, it does not have a pouring spout and is only used as a humidifier.

Document CN2256691Y describes an electric heating thermal insulation, dual purpose thermos container used to heat water. It features a double-deck stainless steel shield insulation and sucks through the middle of the device. The electric heater unit has a pressure switch to replace the normal power switch, and so the shutdown is automatic. However, the device of the document does not have temperature control and does not have a spout adequate for mate beverage.

It is then determined that a thermos with water heating that meets the particular specifications of the present invention is needed in the art.

SUMMARY OF THE INVENTION

The present invention comprises a thermally insulated container comprising: a frusto-conical support base that internally comprises a heat source with connection to an external 110 or 220 VAC supply, a flat support base, and an elongated main body with circular section of thermally insulated walls, with a connector centrally disposed at the base of said body to electrically link a shielded electrical resistance isolated from the hollow interior of said container with the external power supply mounted inside the support base; a stopper with a safety valve and pouring spout for mate beverage; a support to locate a straw; and a double-walled lid that covers the stopper and can be used as a container for mate beverage. The support base comprises a button that operates in sequence for choosing: standby, low temperature and high temperature, and a light indicator that changes color depending on the selected condition.

BRIEF DESCRIPTION OF FIGURES

FIGS. 8A, 8B, 8C, 8D, 8E, 8F, and 8G show the electronic control board circuit.

DETAILED DESCRIPTION OF THE INVENTION

Figure 1:
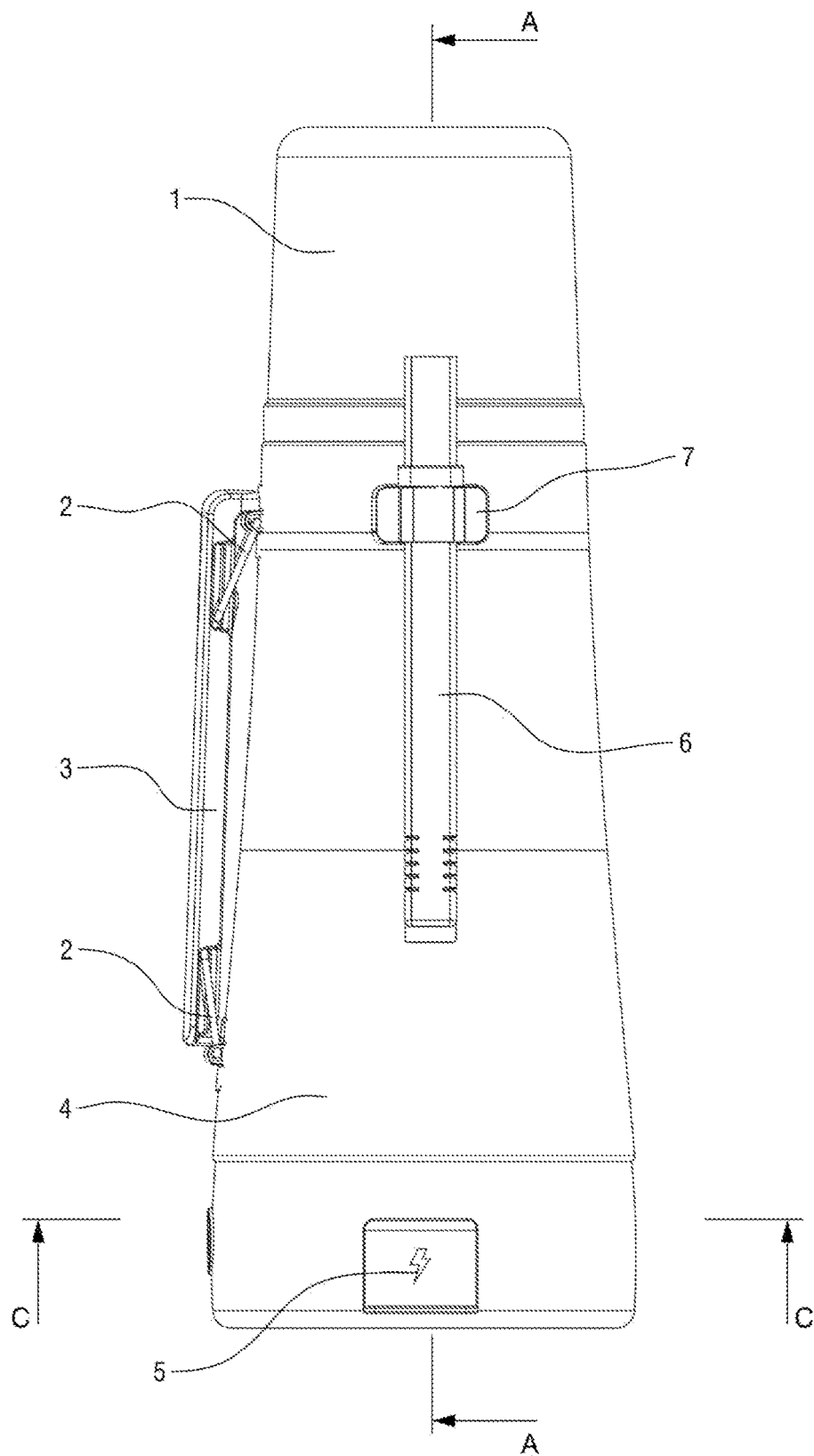
FIG. 1 illustrates a side view of the electric water heater of the present invention.
Figure 2:
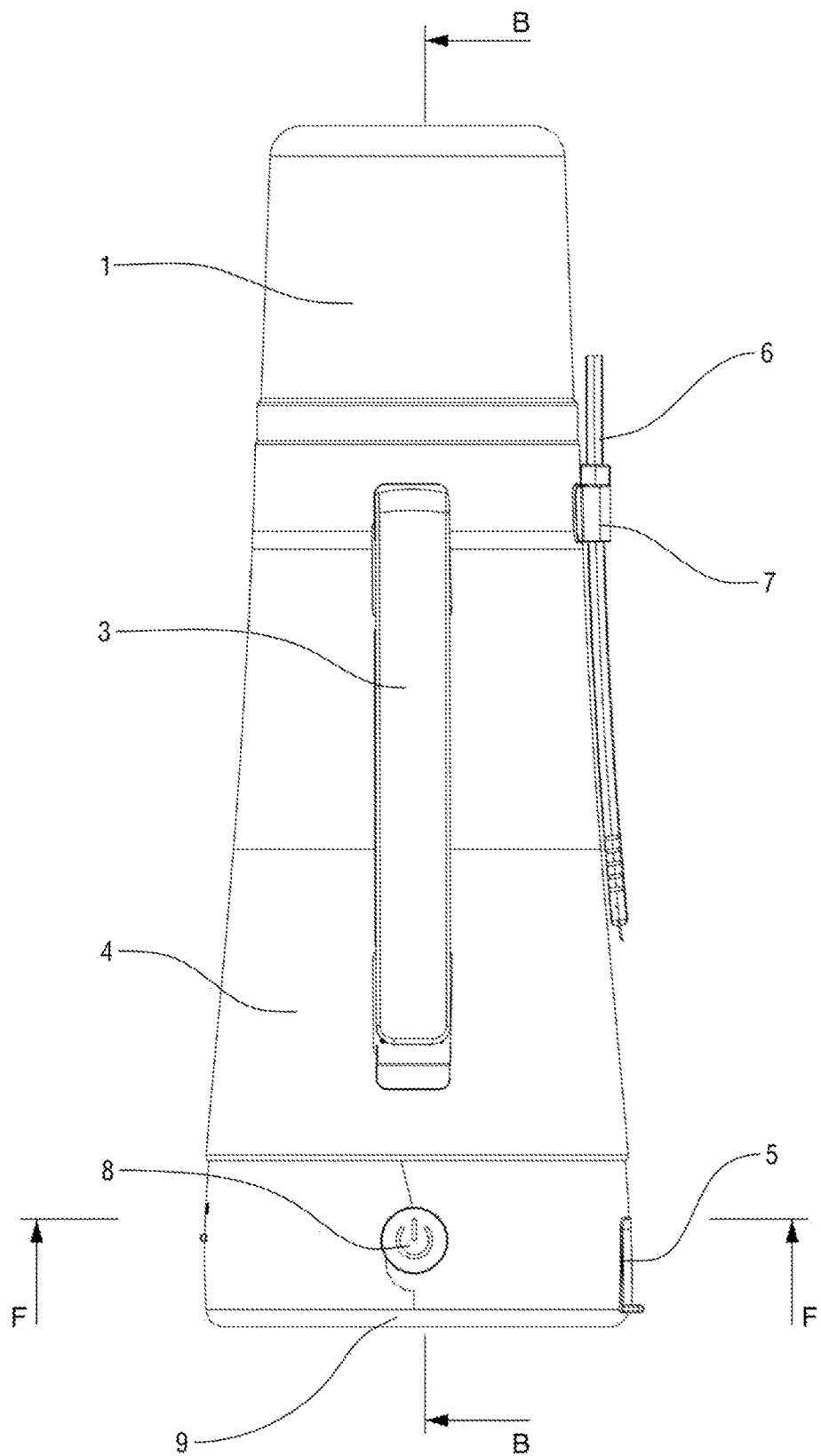
FIG. 2 illustrates a front view of the electric boiler of the present model.
Figure 3:
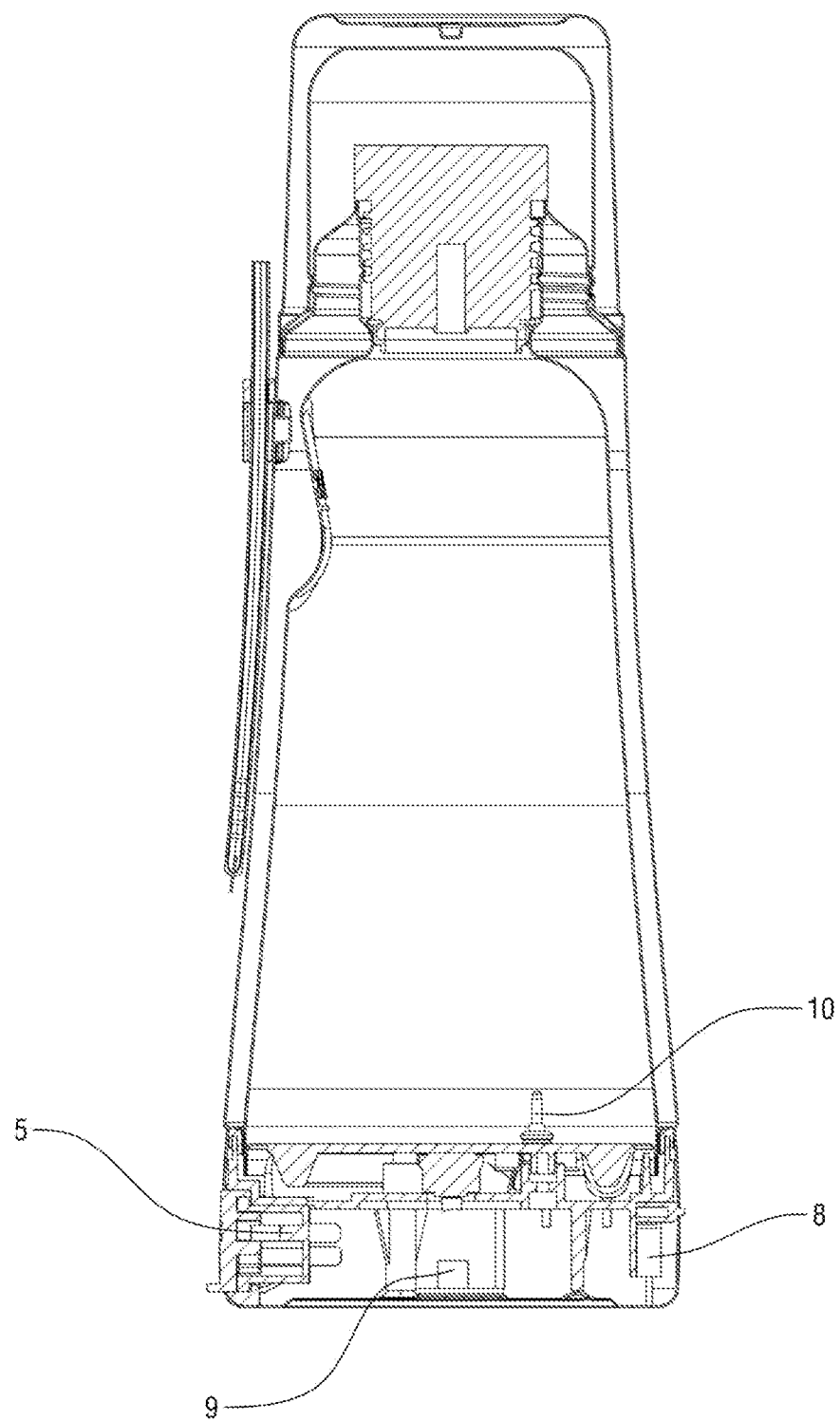
FIG. 3 illustrates a longitudinal section A-A of the electric water heater of the present invention allowing the elements it contains to be seen from the front.

FIGS. 1, 2 and 3 show a first embodiment of the present invention comprising: a lid 1 that is also used as a container for ground mate leaves (yerba mate) to prepare the mate beverage, a handle 3 linked to the body by a set of 2 metal rings 2, a bottle body 4 that is an elongated main container with a circular section and thermally insulated walls, an interlock connector socket 5 and an accessory straw 6 that is supported by a straw holder 7. The function of the rings 2 is to link the handle to the body to give it some flexibility and to avoid being a rigid handle that might take up too much space. The handle 3 has sliders through which the rings 2 move in a conventional way. FIGS. 2 and 3 show the frusto-conical support base 9 on which a function button 8 is mounted and a temperature sensor 10 is seen inside. In a preferred embodiment, the sensor 10 is a NTC (Negative Temperature Coefficient) type. In this first embodiment, the thermos can accommodate up to one liter of water. Handle 3 is made of PP polypropylene polyester. In another alternative embodiment, the thermos is designed to hold a maximum of 500 cc of water and, instead of the handle 3, it has a silicone band to facilitate its grip.

Figure 4:
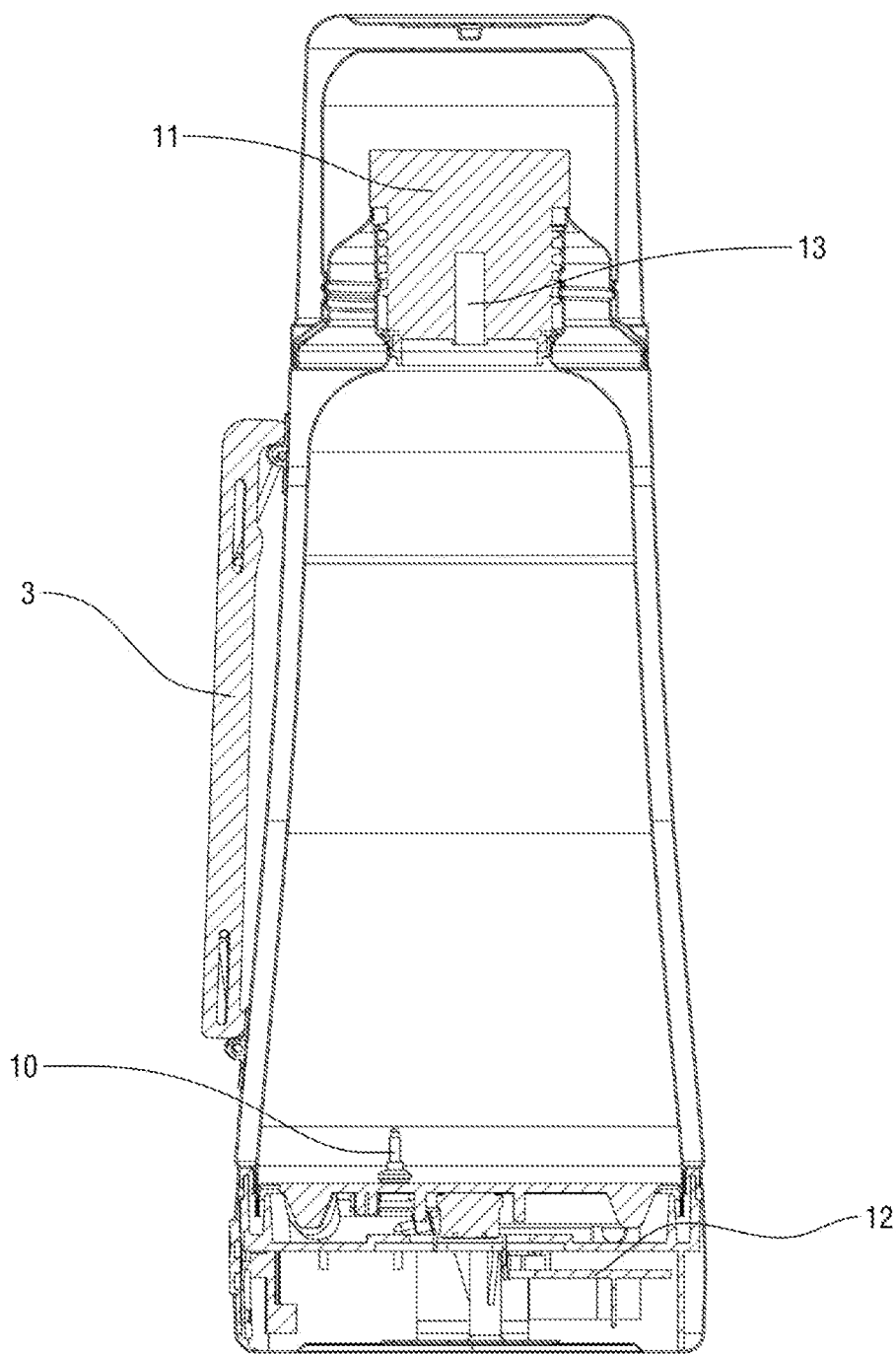
FIG. 4 illustrates another longitudinal section B-B of the electric water heater of the present invention showing a side view of its elements.

FIG. 4 shows the lid 1 with a shutter, a safety valve 13 and a mate beverage preparation plug 11 inside the lid 1 that acts as a closure of the main body and mounted in the mouth of the body by means of a thread. The straw holder 7 comprises an upper opening useful for moving the straw when it is placed inside the container; and it may be seen that the lid 1 is double-walled and covers the plug 11, and it fits on the outer edge of the mouth of the main body and can be used as a container for holding mate beverage.

Figure 5:
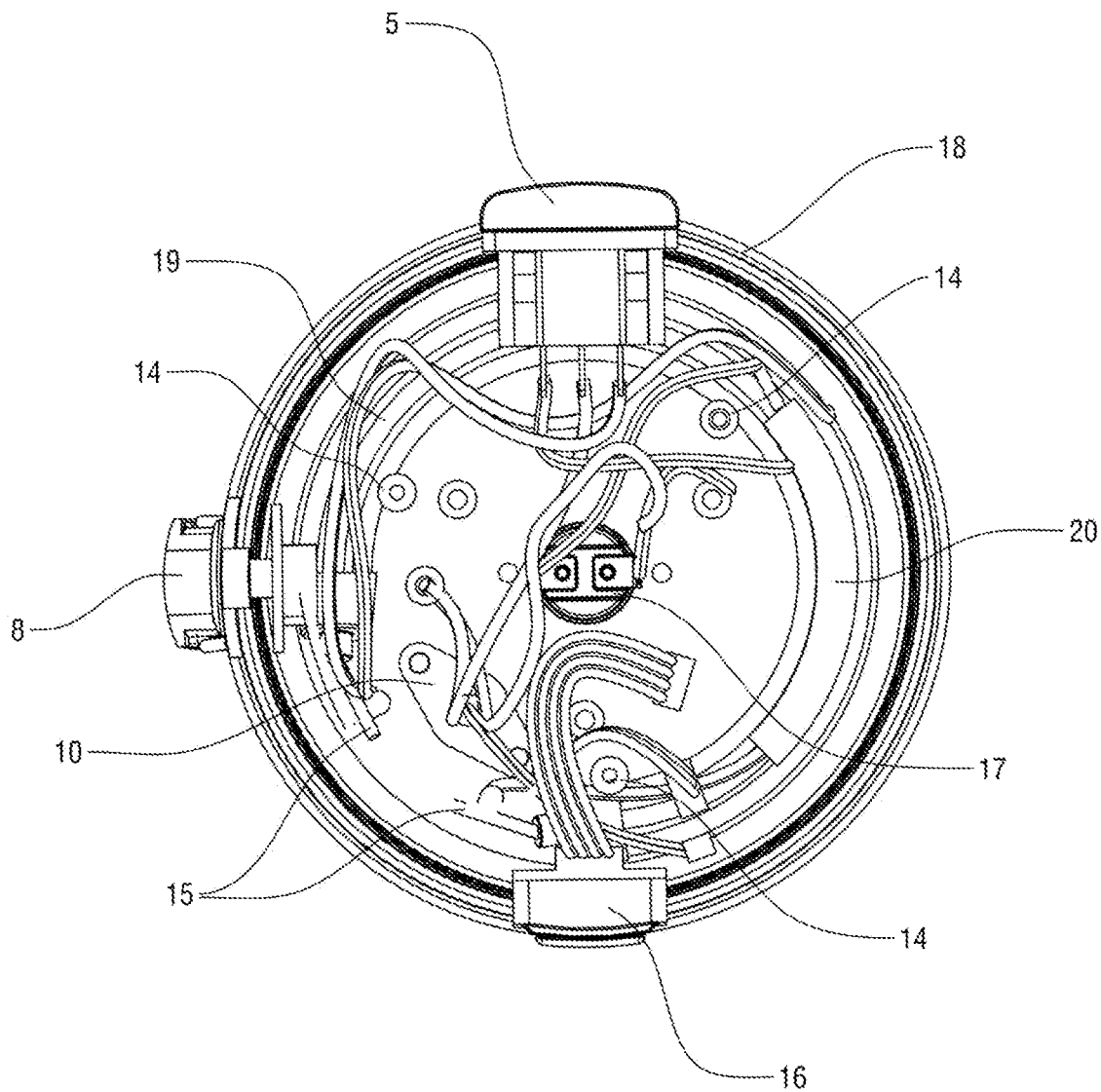
FIG. 5 illustrates a C-C cross section of the electric water heater of the present invention showing the elements it contains from below at the height of the base.
Figure 6:
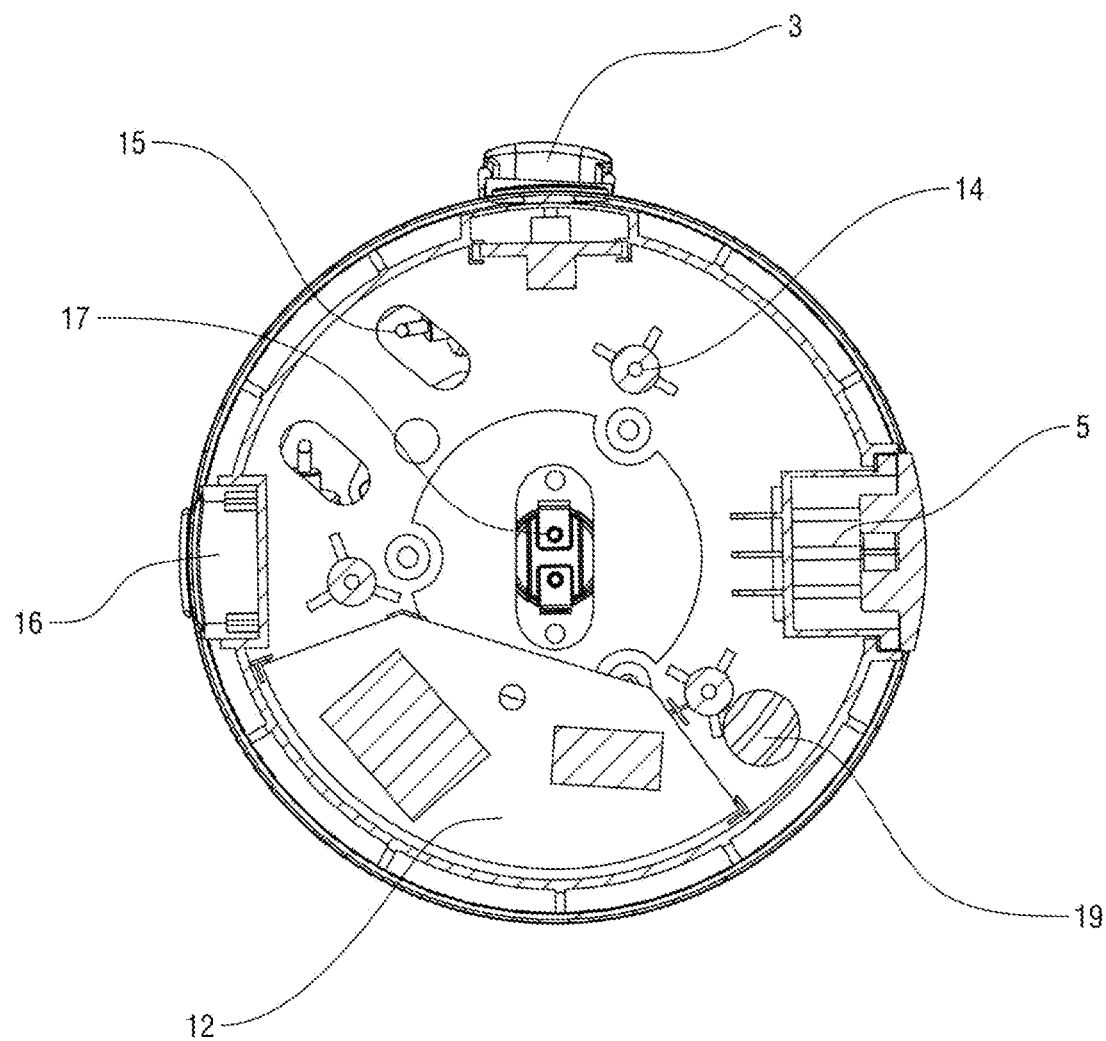
FIG. 6 illustrates another cross section F-F of the electric water heater of the present invention showing the elements it contains from below at the height of the base.

FIGS. 5 and 6 show in a top plan view that the frusto-conical support base 9 has a flat support base 18 that internally comprises a heating plate inside which there is a circular-shaped resistance 19 as a heat source, with connection to a external power supply by means of a cable with an AC plug at one end and an interlock connector 5 in the other; with a pair of connectors 15 arranged radially at the base 9 of said body to electrically link through a thermal protective element 17 and a thermal fuse 20 to the armored electrical resistance 19, facing the hollow interior of said container and separated from it by a metal plate. The frusto-conical support base also includes a light indicator of the type LED 16 that indicates the heating status of the contents of the container. The function button 8 allows selecting two heating modes: (i) low heating and (ii) high heating. Preferably, when connecting the power cable, the indicator 16 remains blue; while the heating function is switched on, the indicator light remains green, and when the temperature of the liquid being heated reaches about 80° C., it turns blue. In one embodiment referred to, the temperature is kept between 78° C. and 82° C. These values are optimal for preparing the mate beverage. When the high heat function is selected, the indicator light stays red, and when the temperature of the water being heated reaches about 92° C. it turns blue. In a preferred embodiment the temperature is maintained between 90° C. and 94° C. These values are optimal for preparing other beverages such as tea or coffee. The lid 1 has a closed and an open position to be able to pour the liquid into the container. The lid 1 in the closed position provides a hermetic seal that avoids heat exchange with the outside to keep it warm or for transporting it. The safety valve 13 of the plug 11 reacts when a certain high pressure is reached in case the control and safety elements fail. On the other hand, the double-walled lid 1 comprises a circular section and a flat support base, widening in the vicinity of the base and narrowing towards the mouth. In this way, the lid 1 has the shape of a typical container used to prepare mate beverage. Indeed, the main application of the device of the present invention is to heat, preserve and maintain water at a suitable temperature in order to prepare mate beverage and serve it to be consumed in the double-walled lid 1 used as a mate beverage container, which is previously loaded with ground mate leaves and using straw 7 to drink it. The device is filled with water and placed on the frusto-conical support base 9 connected to a 110 (@ 60 Hz) or 220 VAC source (@ 50 Hz) so that the resistance 19 heats the heating plate 18, which in turn heats the liquid to a selected temperature (low or high), which is indicated by the indicator light 16. This design allows the resistance 19 to heat the water without coming into contact with it since the only heating element that contacts the water is the heating plate 18 which is made of stainless steel. In this way, the interior hygiene of the container and the lifetime of the heating element 19 are guaranteed. At the same time, the double-walled lid 1 is loaded with the ground mate leaves (yerba mate) and the straw 17 is placed in a suitable position. The stopper of the lid 1 is unlocked and the container for the yerba mate and mate beverage is charged with hot water to prepare the beverage that is served to drink through the straw 17. Likewise, the double-walled lid 1 comprises an external and internal metal wall, both made of SS304 stainless steel with an internal air chamber to prevent heat loss from the mate container and also that the external temperature is tolerable for the user. The double wall formed in this way allows to keep the heat of its content so that the mate beverage is properly prepared and also allows to drink the mate beverage without the external surface being hot. Furthermore, the straw 17 and the walls of the frusto-conical support base 9, of the elongated main body and of the double-walled lid 1 are made of stainless steel.

Figure 7:
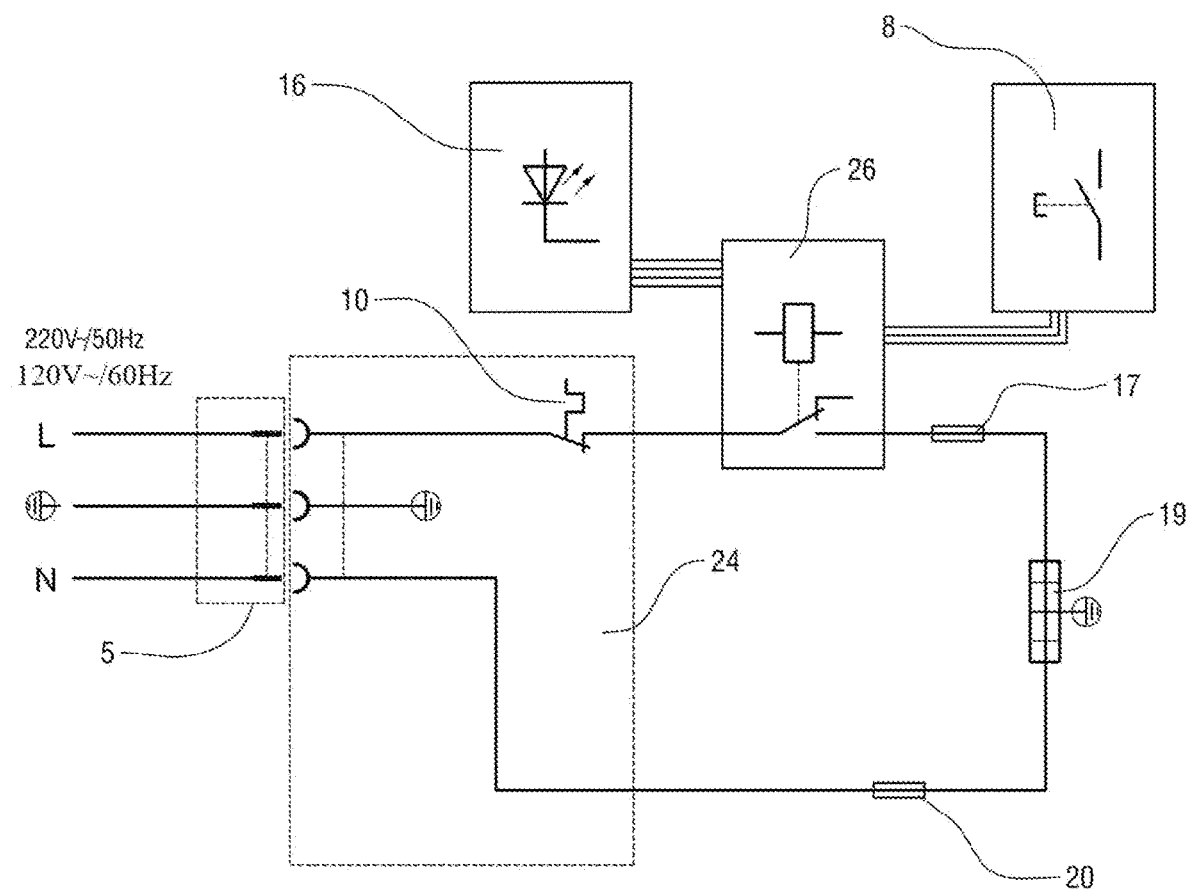
FIG. 7 shows in detail the power connection circuit of the electric boiler.

FIG. 7 show the elements that make up the power circuit of the thermos. The operation of the temperature control is as follows: the water heater has an electronic control board 12 to which the main power is connected through the interlock connector socket 5. It also receives the connection of an NTC 10 temperature sensor to give a signal to a thermostat IC 24, and a function selector button 8 and in turn has a light indicator 16 that indicates the selection made and its status. This board connects and disconnects the resistance power supply depending on the selected condition and the temperature reached inside the thermos. A thermal protector (normal closed) 17 is connected in series with the heating resistor 19 so that, if for some reason the temperature control circuit fails, the resistor 19 is disconnected when reaching the protection temperature. In a preferred embodiment, the thermal protector 17 is of the normal closed bimetallic type, which will open the circuit when the temperature of the base exceeds 100° C. and will reconnect at 90° C. The indicator changes color depending on of sensed temperatures. Additionally, the circuit has a protection of a thermal fuse 20 with a cut-off temperature of 144° C. that, in case the temperature sensor NTC 10 fails first, and if the thermal protector 17 also fails, the fuse 19 would act, cutting the circuit permanently and not resettable.

The device of the present invention has been specifically designed to heat water for the purpose of preparing mate beverage or preparing water-based infusions such as tea or coffee. However, in other situations it is perfectly suitable for heating water for other purposes such as heating water for the preparation of an instant type soup.

In FIGS. 8A-8G it is observed that the electronic control board comprises the following elements:

Line filter with varistor 21.

Half-wave rectifier 22.

Integrated circuit switched source (switching) to obtain 5 VDC 23.

Integrated temperature control circuit 24.

Sequential selector button 8.

Led indicator 16.

Beep sound indicator 25.

Heating resistance command relay 26.

In FIGS. 8A-G FIG. 8A illustrates the source circuit; FIG. 8B the buzzer circuit; FIG. 8C the power control of the heating resistance; FIG. 8D shows the Led command; FIG. 8E shows the push button circuit; FIG. 8F shows the temperature sensor connector contacts and FIG. 8G shows the temperature control IC.

The heating plate of the device of the first embodiment that houses 1 liter of water comprises a shielded resistance of 700 W of power at 220 VAC injected into the base of the aluminum thermos. In the alternative embodiment of the thermos that houses 500 cc of water, the power of the shielded resistance is approximately 350W at 220 VAC.

Figure 9A:
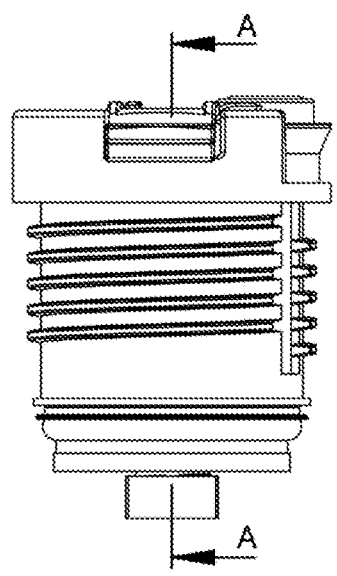
FIGS. 9A and 9B show the safety pressure element of the lid.
Figure 9B:
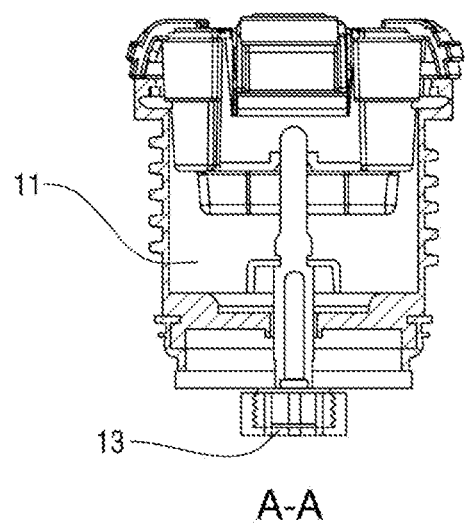
Figure 10:
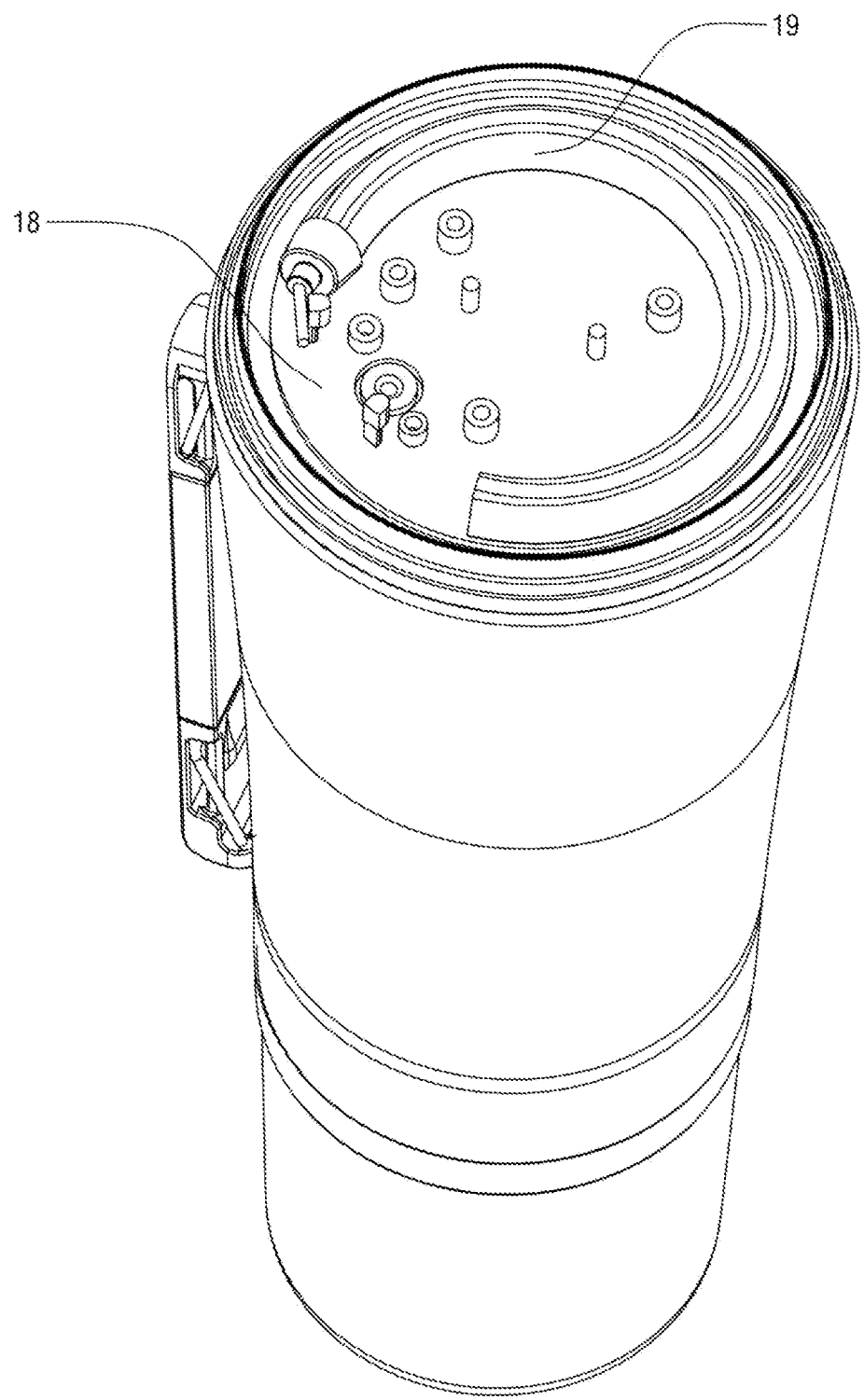
FIG. 10 shows the heating element of the present invention.

The operation of the safety valve 13 is as follows: if any of the controls or protections described above fails and the resistance keeps still energized, the temperature of the water would increase, reaching a boiling point and raising pressure inside the container. Should this happen, the lid 1 has a safety element 13 that would be activated by releasing the internal pressure. In a preferred embodiment, security element 13 (See FIG. 9) consists of an element made with a different material from the rest of the lid, preferably polytetrafluoroethylene, better known as Teflon®, which allows the release of steam but not of water. The element comprises a membrane that, due to its small thickness, is permeable to vapor but not to liquid, allowing vapor to be released but not allowing water to escape. Said security element 13 is not resettable so that the device will need to be repaired, solving the causes that originated the activation of the security element and restoring it for future uses.

In a first embodiment, the container has a capacity of 1 liter, the power it consumes is approximately 700 W with a supply voltage of 220 VAC, @ 50 Hz, an approximate weight without content of 920 gr, with a temperature indicator light selected and finished cycle. In an alternative embodiment, the container has a capacity of 500 cc, the total power it consumes is approximately 350 W with a supply voltage of 220 VAC, @ 50 Hz, an approximate weight without content of 500 gr, with an indicator light of selected temperature and finished cycle. The material of the bottle is SS304 (18/8) stainless steel, with the bottle and matte with vacuum chamber.

| ANNEX | |
|---|---|
| Referencia | Descripción |
| 1 | Lid/mate container |
| 2 | Handle ring |
| 3 | Handle |
| 4 | Bottle body |
| 5 | 220 VCA socket -interlock connector |
| 6 | Straw |
| 7 | Straw holder |
| 8 | Function button |
| 9 | Base |
| 10 | Temperature sensor (NTC) |
| 11 | Plug with pouring spout |
| 12 | Control IC |
| 13 | Security element |
| 14 | Mounting column |
| 15 | Heating resistance terminal |
| 16 | LED indicator |
| 17 | Thermal protector |
| 18 | Heating plate |
| 19 | Heating resistance |
| 20 | Thermal fuse |
| 21 | Varistor line filter |
| 22 | Half wave rectifier |
| 23 | Switching power supply IC |
| 24 | Temperarture control IC |
| 25 | Beeper |
| 26 | Heating resistance relay |

What I claim:

1. An electric thermal container to hold a volume of water that heats and maintains temperature at two preset values, comprising: a main body with thermally insulated walls, a gripping element mounted on the main body, a plug with a shutter comprising a pouring spout and configured as a closure of the main body and mounted in the mouth of said main body by means of a thread; a light indicator that shows a heating status of the water contained in the container, a function selector push button and a double-walled lid that covers the plug and fits on an edge external of the mouth of the main body;

wherein said plug with said shutter comprises a safety pressure element comprising a membrane that allows steam to be released and avoids water to escape from the container; wherein the container further comprises a support base containing a heating plate containing a heating electrical resistance with connection to an external electrical supply and said heating plate being exposed to the hollow interior of said container; wherein the heating electrical resistance is connected in series with a thermal protector and a thermal fuse, and wherein temperature control is managed by means of an electronics circuit board.

2. The container of claim 1, wherein the electronics circuit board comprises: a line filter; a rectifier circuit; a source integrated circuit; an integrated temperature control circuit; an audible indicator; and a heating resistance command relay.

3. The container of claim 1, further comprising a temperature sensor of a NTC type.

4. The container of claim 2, wherein said line filter comprises a varistor and said rectifier circuit is half wave.

5. The container of claim 2, wherein said source integrated circuit comprises a voltage source of a switched type (switching) to generate 5 VDC.

6. The container of claim 1, wherein said safety pressure element is formed by an element made of polytetrafluoroethylene.

7. The container of claim 1, wherein said thermal protector opens the heating electrical resistance when an internal temperature of the container exceeds 100° C.

8. The container of claim 1, wherein said thermal fuse opens the resistance circuit when an internal temperature of the container exceeds 144° C.

9. The container of claim 1, wherein said heating electrical resistance is a semi-circular armored resistance.

10. The container of claim 1, wherein said function selector push button comprises two heating mode positions: (i) low heating and (ii) high heating; wherein low heating the water temperature is maintained between 78° C. and 82° C. and in high heating the water temperature is maintained between 90° C. and 94° C.

11. The container of claim 1, configured to hold up to 1 liter of water and having an electric consumption of approximately 700 W powered with 220 VAC.

12. The container of claim 1, holding up to 500 cc of water and having an electric consumption of approximately 350 W powered with 220 VAC.

13. The container of claim 1, wherein the double-walled lid comprises a circular section and a flat support base, widening in the vicinity of the support base and narrowing towards the mouth.

14. The container of claim 1, wherein the double-walled lid comprises an external and an internal wall, both made of SS304 stainless steel, with an internal air chamber.

15. The container of claim 11, wherein said gripping element is a handle linked to the main body by two metal rings.

16. The container of claim 12, wherein said gripping element is a silicone band.

17. The container of claim 15, wherein the handle is made of polypropylene PP polyester.

* * * * *